US009656199B2

(12) United States Patent
Lee (10) Patent No.: US 9,656,199 B2
(45) Date of Patent: May 23, 2017

(54) OIL MIST FILTER

(71) Applicant: Tung-Tsai Lee, Changhua Hsien (TW)

(72) Inventor: Tung-Tsai Lee, Changhua Hsien (TW)

( * ) Notice: Subject to any disclaimer, the term of this patent is extended or adjusted under 35 U.S.C. 154(b) by 197 days.

(21) Appl. No.: 14/638,751

(22) Filed: Mar. 4, 2015

(65) Prior Publication Data

US 2016/0256810 A1 Sep. 8, 2016

(51) Int. Cl.
*B01D 46/00* (2006.01)
*B01D 46/24* (2006.01)

(52) U.S. Cl.
CPC ....... *B01D 46/0041* (2013.01); *B01D 46/003* (2013.01); *B01D 46/0021* (2013.01); *B01D 46/0023* (2013.01); *B01D 46/0045* (2013.01); *B01D 46/2411* (2013.01); *B01D 46/2414* (2013.01); *B01D 2275/201* (2013.01); *B01D 2275/208* (2013.01)

(58) Field of Classification Search
CPC .............. B01D 46/0021; B01D 46/003; B01D 46/0041; B01D 46/0043; B01D 46/2411; B01D 46/2414; B01D 46/521; B01D 2275/201; B01D 2275/208; B01D 46/0045

See application file for complete search history.

(56) References Cited

U.S. PATENT DOCUMENTS

| | | | | |
|---|---|---|---|---|
| 6,833,023 B1 * | 12/2004 | Vandenberghe | ..... | B01D 29/906 55/337 |
| 7,179,315 B2 * | 2/2007 | Huang | ............... | B01D 46/0046 55/337 |
| 7,452,395 B2 * | 11/2008 | Fiello | ................ | B01D 46/0024 123/198 E |
| 2002/0170856 A1 * | 11/2002 | Jaroszczyk | ........... | B01D 29/111 210/493.5 |
| 2009/0038276 A1 * | 2/2009 | Gunderson | ........ | B01D 46/0021 55/343 |
| 2010/0313533 A1 * | 12/2010 | Muenkel | ............ | B01D 46/0021 55/484 |
| 2011/0000458 A1 * | 1/2011 | Muenkel | ............ | B01D 46/0021 123/198 E |
| 2013/0315713 A1 * | 11/2013 | Jarrier | ................ | B01D 46/0021 415/121.2 |
| 2014/0014597 A1 * | 1/2014 | Knight | ................... | B01D 29/50 210/806 |
| 2014/0053521 A1 * | 2/2014 | Muenkel | ............ | B01D 46/0021 55/489 |
| 2014/0290194 A1 * | 10/2014 | Muenkel | ............ | B01D 46/0024 55/482 |
| 2016/0250578 A1 * | 9/2016 | Lee | ...................... | B01D 50/002 |

\* cited by examiner

*Primary Examiner* — Robert Clemente (57) ABSTRACT

An oil mist filter is fixed on an air intake of an oil mist collector and contains: a first cover, a second cover, a first filtering unit, a third cover, and a second filtering unit. The first cover is hollow and includes a first through orifice. The second cover is hollow and includes a second through orifice. The first filtering unit is fixed between the first cover and the second cover and includes a chamber for guiding oily substances from the first through orifice. The third cover is placed in the chamber and includes a collection portion and plural arcuate guiding portions radially extending outward from the collection portion. The second filtering unit is disposed between the second cover and the third cover to filter the oily substances from the chamber, and then the oily substances are guided out of the second through orifice via the plural guiding portions.

10 Claims, 7 Drawing Sheets

OIL MIST FILTER

BACKGROUND OF THE INVENTION

1. Technical Field

The present invention relates to filtering apparatus, and more particularly to an oil mist filter which facilitates air to guide turbulent flow greatly and enhances filtration.

2. Description of Related Art

A conventional purifying apparatus is applicable for CNC machines, petrochemical industry, pharmaceutical industry, paint spraying industry, and catering kitchen industry to filter oils, mists, smokes, or hazes.

The conventional purifying apparatus contains a flat filtration panel on which plural filtering layers are stacked, and each filtering layer has a plurality of mesh grids formed therein.

However, when a power assembly of air ventilation draws air, the flat filtration panel produces air resistance seriously, thus decreasing filtration.

Another conventional purifying apparatus is formed in an inverted U shape and contains a filtration assembly for filtering oily substances. But a chamber of the purifying apparatus is close, so air flows unevenly to reduce filtration.

The present invention has arisen to mitigate and/or obviate the afore-described disadvantages.

SUMMARY OF THE INVENTION

The primary objective of the present invention is to provide an oil mist filter in which oily substances are filtered by a first filtering unit and a second filtering unit, and air is guided by a plurality of guiding portions of a third cover to increase turbulence effect.

Another objective of the present invention is to provide an oil mist filter which accelerates a flowing speed of air and guides air evenly to enhance filtration by using the plurality of guiding portions of the third cover.

To obtain the above objective(s), an oil mist filter provided by the present invention contains: a first cover, a second cover, a first filtering unit, a third cover, and a second filtering unit.

The first cover is hollow and includes a first through orifice defined on a central position thereof. The second cover is hollow and includes a second through orifice defined on a central position thereof. The first filtering unit is formed in a column shape and is fixed between the first cover and the second cover, and the first filtering unit includes a chamber defined therein to guide oily substances from the first through orifice, thus filtering the oily substances by using the first filtering unit. The third cover is placed in the chamber, and the third cover includes a collection portion formed on a central position thereof and a plurality of arcuate guiding portions radially extending outward from the collection portion. The second filtering unit is disposed between the second cover and the third cover to filter the oily substances from the chamber, and then the oily substances are guided out of the second through orifice of the second cover via the plurality of guiding portions.

Preferably, an external power accelerates a disposition of the oily substances and enhances a filtration of the oily substances. In addition, the plurality of guiding portions of the third cover guide air evenly to reduce air resistance.

Preferably, when the third cover is in a concaved disc shape and air is guided into the third cover, most parts of air spray onto the collection portion and are guided by the plurality of guiding portions to spray air upwardly toward the first filtering unit and the second filtering unit, thus flowing the oily substances quickly and increasing filtration area.

DETAILED DESCRIPTION OF THE PREFERRED EMBODIMENTS

Figure 1:
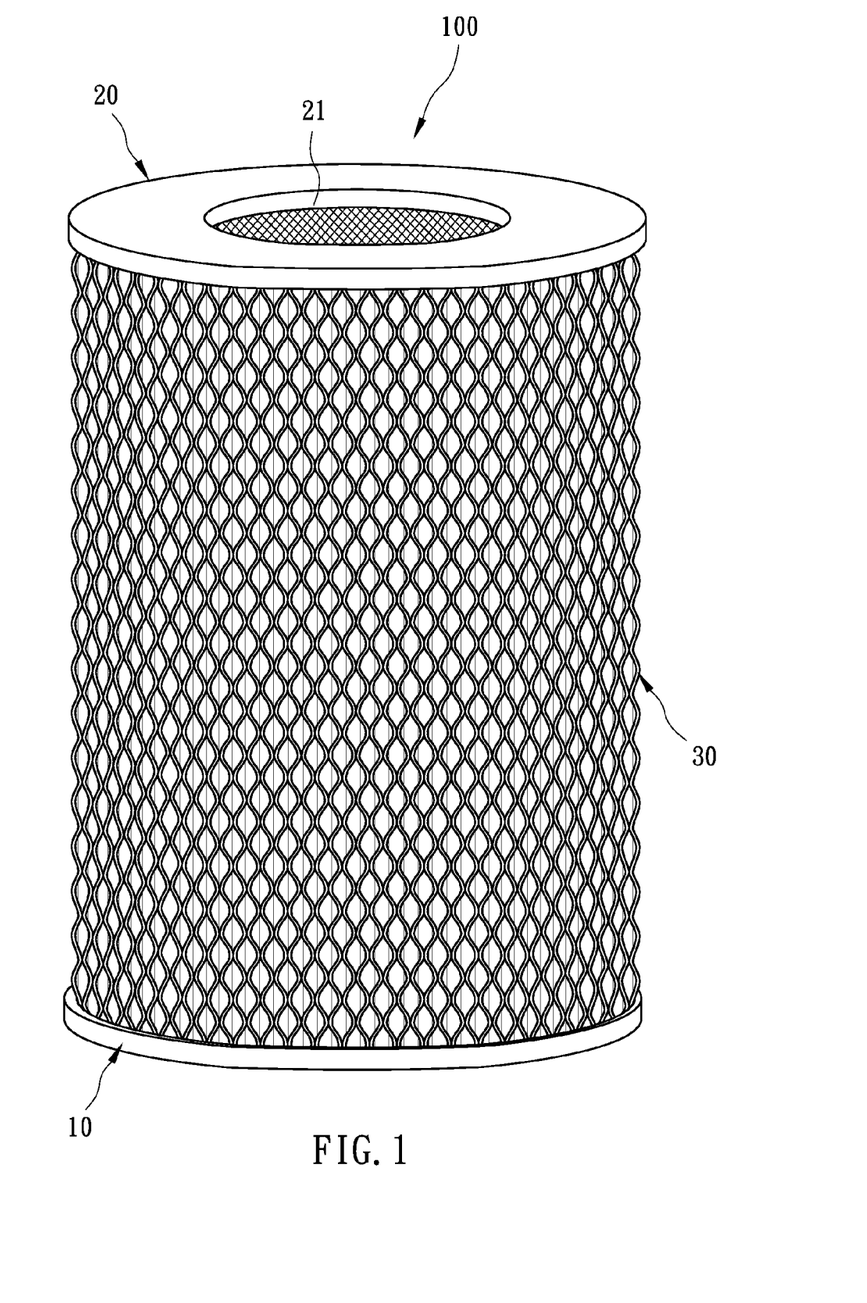
FIG. 1 is a perspective view showing the assembly of an oil mist filter according to a first embodiment of the present invention.
Figure 4:
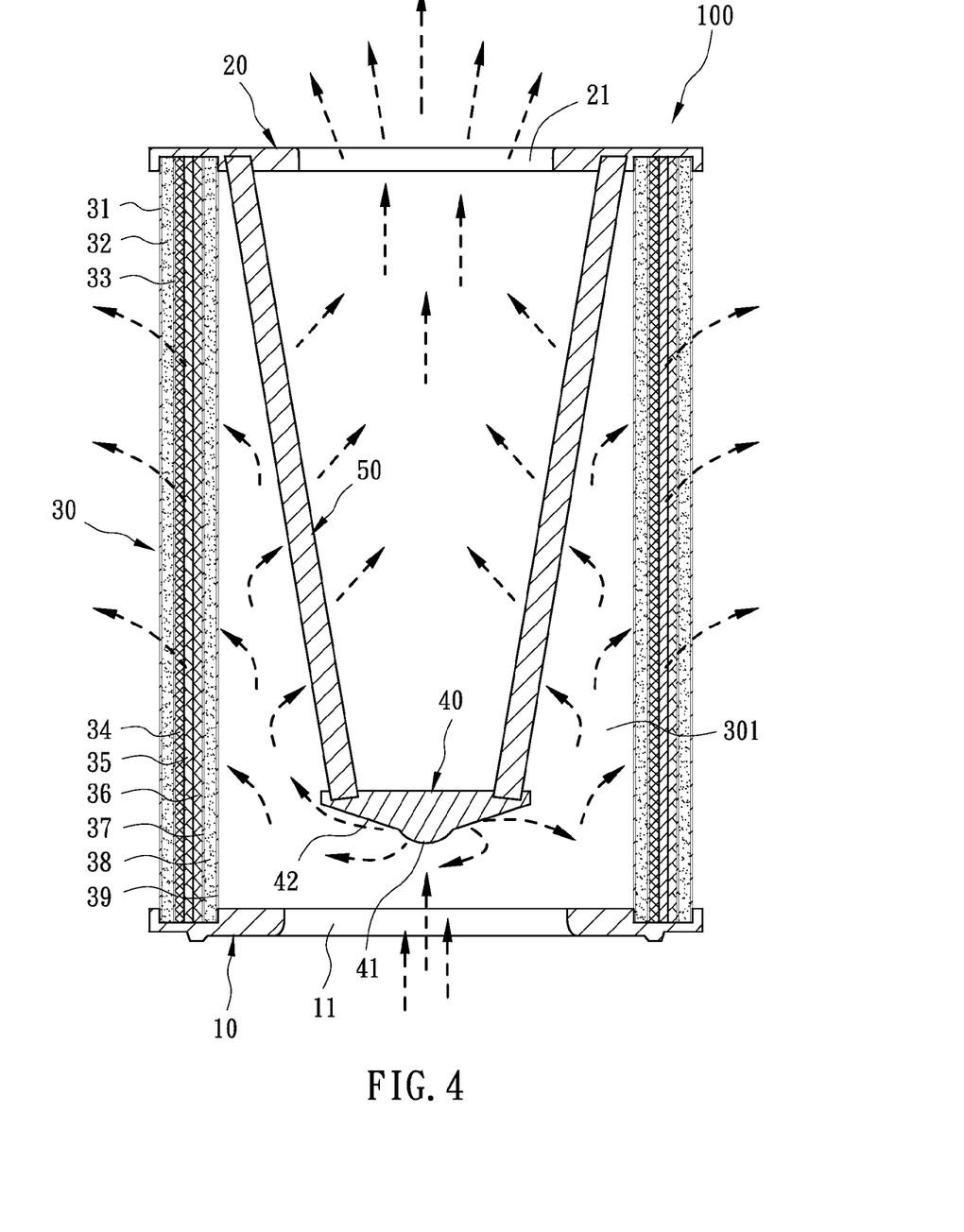
FIG. 4 is a cross sectional view showing the assembly of the oil mist filter according to the first embodiment of the present invention.
Figure 7:
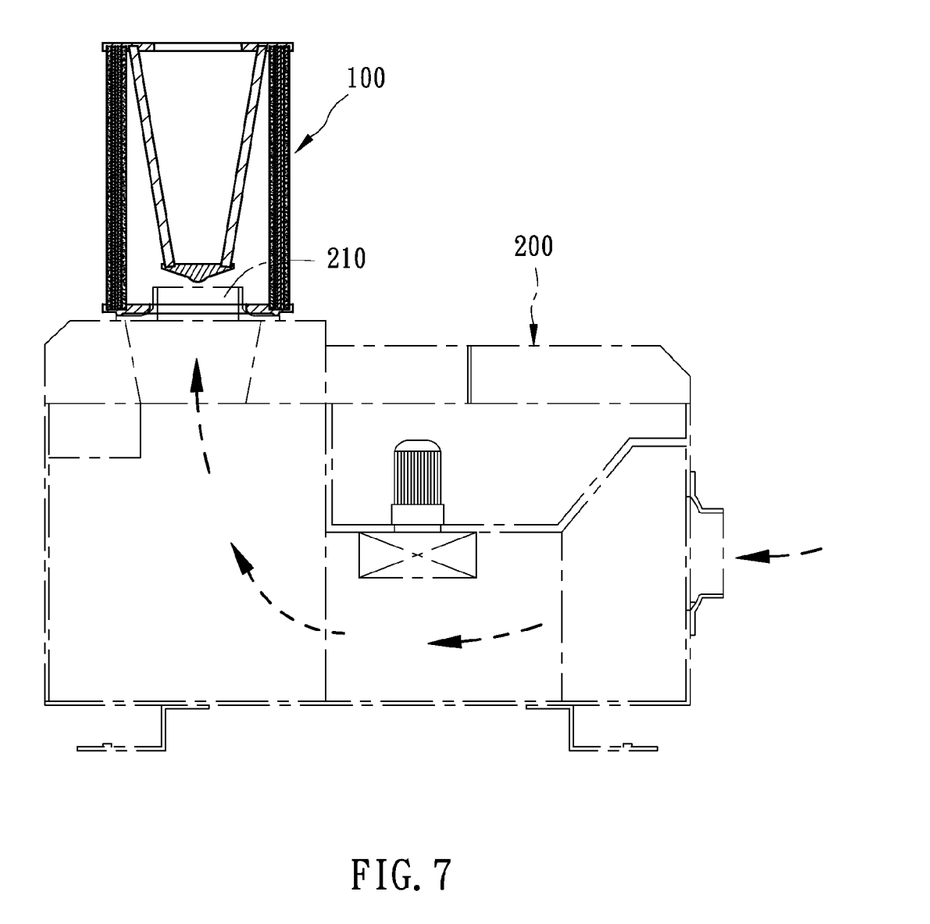
FIG. 7 is a cross sectional showing the application of the oil mist filter according to the first embodiment of the present invention.

With reference to FIG. 7, an oil mist filter 100 according to a first embodiment of the present invention is fixed on an air intake 210 of an oil mist collector 200. Referring further to FIGS. 1 and 4, the oil mist filter 100 comprises a first cover 10, a second cover 20, and a first filtering unit 30, a third cover 40, and a second filtering unit 50.

Figure 2:
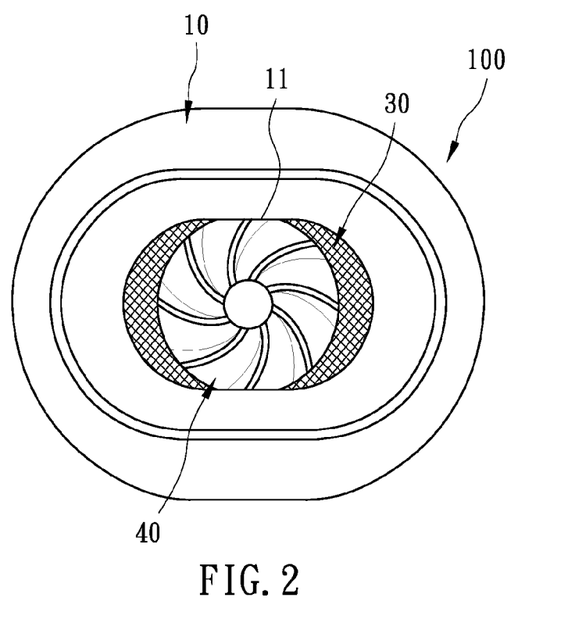
FIG. 2 is a bottom plan view showing the assembly of the oil mist filter according to the first embodiment of the present invention.

As shown in FIG. 2, the first cover 10 is hollow and in an ellipse shape, and the first cover 10 includes a first through orifice 11 defined on a central position thereof, wherein the first through orifice 11 is oval.

Figure 3:
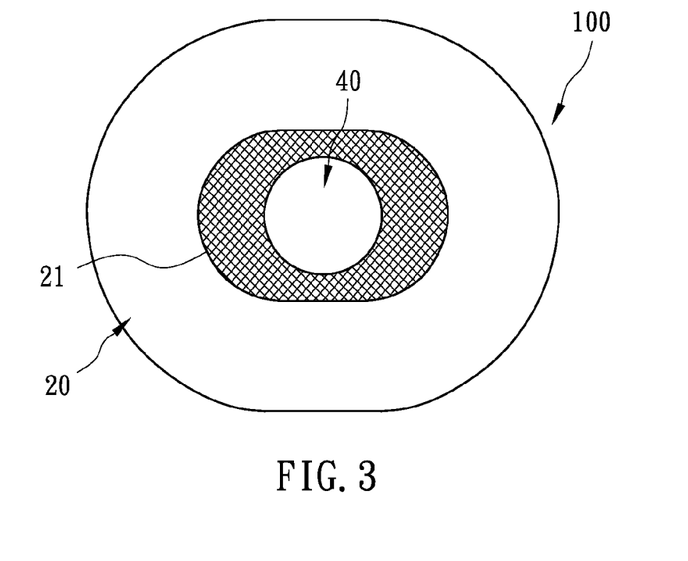
FIG. 3 is a top plan view showing the assembly of the oil mist filter according to the first embodiment of the present invention.

As illustrated in FIG. 3, the second cover 20 is hollow and in an ellipse shape, and the second cover 20 includes a second through orifice 21 defined on a central position thereof, wherein the second through orifice 21 is oval.

With reference to FIG. 4, the first filtering unit 30 is formed in a column shape and is fixed between the first cover 10 and the second cover 20, the first filtering unit 30 includes a chamber 301 defined therein to guide oily substances (such as oils, mists, smokes, or hazes) from the first through orifice 11, thus filtering the oily substances by using the first filtering unit 30. The first filtering unit 30 also includes an internal mesh 31, a fabric filtration layer 32, a first steel mesh 33, an oil water separating layer 34, two micro fiberglass layers 35, 36, a second steel mesh 37, a fiber protection layer 38, and an external mesh 39. Each of the internal mesh 31 and the external mesh 39 is made of metal material and has plural rhombus mesh grids formed therein. Further, the internal mesh 31, the first steel mesh 33, the second steel mesh 37, and the external mesh 39 are made of stainless steel to resist against high temperature and acid corrosion.

Figure 5:
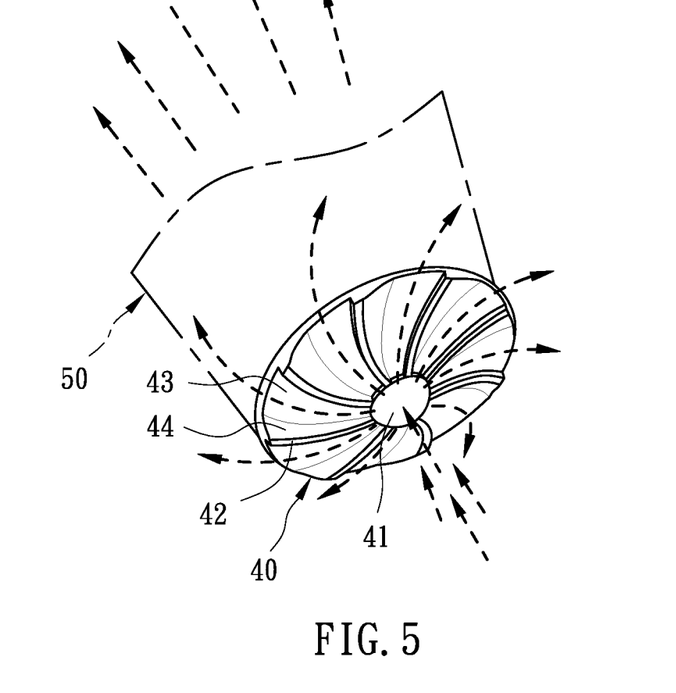
FIG. 5 is a perspective view showing the assembly of a part of a third cover of the oil mist filter according to the first embodiment of the present invention.

Referring to FIG. 5, the third cover 40 is placed in the chamber 301, and the third cover 40 includes a collection portion 41 formed on a central position thereof and a plurality of arcuate guiding portions 42 radially extending outward from the collection portion 41. In this embodiment, the third cover 40 is in a cone shape, the collection portion 41 projects outwardly, and each guiding portion 42 obliquely extends outward from the collection portion 41, wherein between any two guiding portions 42 of the third cover 40 is defined a groove 43, and between one side of each guiding portion 42 and the groove 43 is formed an arcuate slope face 44, such that air flows on the third cover 40 smoothly. Furthermore, an inclination angle of each guiding portion 42 of the third cover 40 is 70 degrees.

Figure 6:
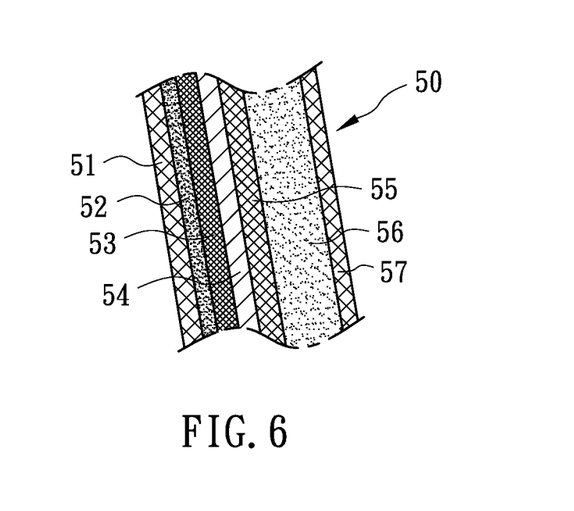
FIG. 6 is a cross sectional view showing the assembly of a part of a second filtering unit of the oil mist filter according to the first embodiment of the present invention.

As shown in FIGS. 4 to 6, the second filtering unit 50 is disposed between the second cover 20 and the third cover 40 to filter the oily substances from the chamber 301, and then the oily substances are guided out of the second through orifice 21 of the second cover 20 via the plurality of guiding portions 42. The second filtering unit 50 includes an outer mesh 51, an air mesh 52, a deposition mesh 53, a connecting mesh 54, a layer mesh 55, an oil water separating layer 56, and an inner mesh 57. Each of the outer mesh 51 and the inner mesh 57 is made of metal material and has plural rhombus mesh grids formed therein. The air mesh 52 has plural mesh grids intersected one another and made of a metal wire, the deposition mesh 53 has plural mesh grids intersected one another and made of a metal wire, wherein a diameter of each mesh grid of the air mesh 52 is less than a diameter of each mesh grid of the deposition mesh 53, and a size of each mesh grid of the air mesh 52 is less than a size of each mesh grid of the deposition mesh 53. The connecting mesh 54 has plural mesh grids obliquely arranged therein and made of metal material, and the layer mesh 55 has plural mesh grids intersected one another, wherein a size of each mesh grid of the layer mesh 55 is less than those of the outer mesh 51 and the inner mesh 57. In addition, each of the layer mesh 55, the outer mesh 51 and the inner mesh 57 is made of stainless steel to resist against high temperature and acid corrosion, and the oil water separating layer 56 is made of fiber material.

Thereby, when the oily substances enter into the chamber 301 from the first through orifice 11, the third cover 40 guides the oily substances by ways of the plurality of guiding portions 42, thus flowing air quickly and evenly. It is to be noted that a part of the oily substances flows through the internal mesh 31 and the fabric filtration layer 32 of the first filtering unit 30 to be filtered initially, and then its oil and water are separated by the first steel mesh 33 and the oil water separating layer 34 and are collected by the two micro fiberglass layers 35, 36. Finally, its oil and water are filtered by the second steel mesh 37, the fiber protection layer 38, and the external mesh 39. Preferably, the quicker a flowing speed of air is and the greater a diameter of aerosols is (for example, the diameter of the aerosols is greater than 0.1 μm), the better the filtration is. In other words, when the flowing speed of air becomes quickly, a friction generates among the oily substances and the two micro fiberglass layers 35, 36, thus obtaining static electricity to attach the oily substances on the two micro fiberglass layers 35, 36. When the flowing speed of air becomes slowly, a cooling effect is realized.

The part of the oily substances are further guided out of the plurality of guiding portion 42 of the third cover 40 and are filtered by the second filtering unit 50 via the outer mesh 51, the air mesh 52, the deposition mesh 53, the connecting mesh 54, the layer mesh 55, the oil water separating layer 56, and the inner mesh 57, thus filtering the oily substances up to 99% and eliminating harmful aerosols up to 0.03 micron.

Preferably, an external power accelerates a disposition of the oily substances and enhances a filtration of the oily substances. In addition, the plurality of guiding portions 42 of the third cover 40 guide air evenly to reduce air resistance. Accordingly, the oil mist filter of the present invention is applicable for CNC machines, petrochemical industry, pharmaceutical industry, paint spraying industry, and catering kitchen industry to filter oils, mists, smokes, or hazes.

Figure 8:
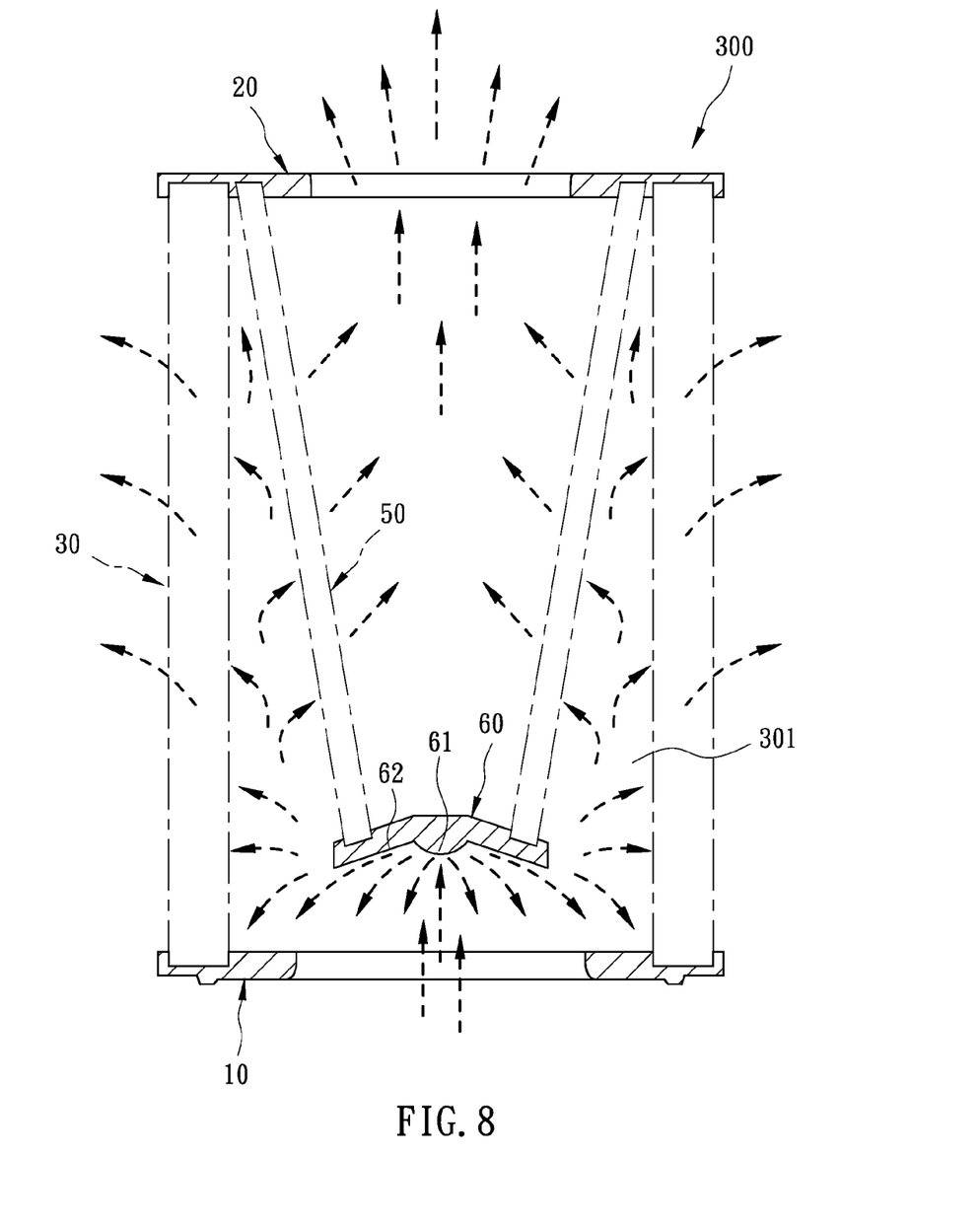
FIG. 8 is a cross sectional view showing the assembly of an oil mist filter according to a second embodiment of the present invention.
Figure 9:
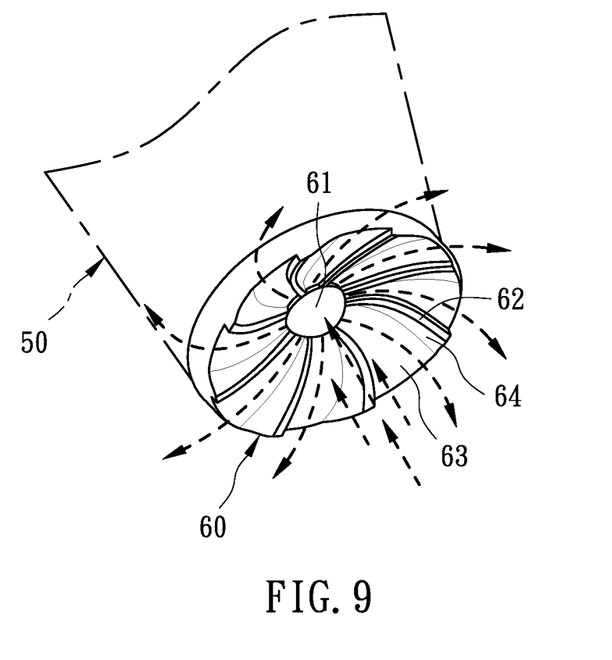
FIG. 9 is a perspective view showing the assembly of a part of a third cover of the oil mist filter according to the second embodiment of the present invention.

As illustrated in FIGS. 8 and 9, an oil mist filter 100 according to a second embodiment of the present invention comprises a first cover 10, a second cover 20, a first filtering unit 30, a third cover 60, and a second filtering unit 50.

The third cover 60 is placed in a chamber 301 of the first filtering unit 30, and the third cover 60 includes a collection portion 61 formed on a central position thereof and a plurality of arcuate guiding portions 62 radially extending outward from the collection portion 61. In this embodiment, the third cover 60 is in a concaved disc shape, the collection portion 61 projects outwardly, and each guiding portion 62 obliquely extends outward from the collection portion 61, herein between any two guiding portions 62 of the third cover 60 is defined a groove 63, and between one side of each guiding portion 62 and the groove 63 is formed an arcuate slope face 64, such that air flows on the third cover 60 smoothly.

Because the third cover 60 is in the concaved disc shape, when air is guided into the third cover 60, most parts of air spray onto the collection portion 61 and are guided by the plurality of guiding portions 62 to spray air upwardly toward the first filtering unit 30 and the second filtering unit 50, thus flowing the oily substances quickly and increasing filtration area.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An oil mist filter being fixed on an air intake of an oil mist collector and comprising:
   a first cover being hollow and including a first through orifice defined on a central position thereof;
   a second cover being hollow and including a second through orifice defined on a central position thereof;
   a first filtering unit formed in a column shape and fixed between the first cover and the second cover, the first filtering unit including a chamber defined therein to guide oily substances from the first through orifice, thus filtering the oily substances by using the first filtering unit;
   a third cover placed in the chamber, and the third cover including a collection portion formed on a central position thereof and a plurality of arcuate guiding portions radially extending outward from the collection portion;
   a second filtering unit disposed between the second cover and the third cover to filter the oily substances from the chamber, and then the oily substances being guided out of the second through orifice of the second cover via the plurality of guiding portions;

wherein the first filtering unit also includes an internal mesh, a fabric filtration layer, a first steel mesh, an oil water separating layer, two micro fiberglass layers, a second steel mesh, a fiber protection layer, and an external mesh.

2. The oil mist filter as claimed in claim 1, wherein between any two guiding portions of the third cover is defined a groove, and between one side of each guiding portion and the groove is formed an arcuate slope face.

3. The oil mist filter as claimed in claim 1, wherein the collection portion of the third cover projects outwardly, each guiding portion of the third cover obliquely extends outward from the collection portion, and an inclination angle of each guiding portion of the third cover is 70 degrees.

4. The oil mist filter as claimed in claim 1, wherein each of the internal mesh and the external mesh is made of metal material and has plural rhombus mesh grids formed therein.

5. The oil mist filter as claimed in claim 1, wherein the second filtering unit includes an outer mesh, an air mesh, a deposition mesh, a connecting mesh, a layer mesh, an oil water separating layer, and an inner mesh.

6. The oil mist filter as claimed in claim 5, wherein each of the outer mesh and the inner mesh is made of metal material and has plural rhombus mesh grids formed therein.

7. The oil mist filter as claimed in claim 1, wherein the third cover is in a cone shape.

8. The oil mist filter as claimed in claim 1, wherein the third cover is in a concaved disc shape.

9. The oil mist filter as claimed in claim 1, wherein the first cover and the second cover are in an ellipse shape.

10. The oil mist filter as claimed in claim 1, wherein the first through orifice of the first cover and the second through orifice of the second cover are oval.

\* \* \* \* \*